(No Model.) 2 Sheets—Sheet 1.
C. NIDA.
MACHINE FOR CLEANING INTESTINES.
No. 289,302. Patented Nov. 27, 1883.
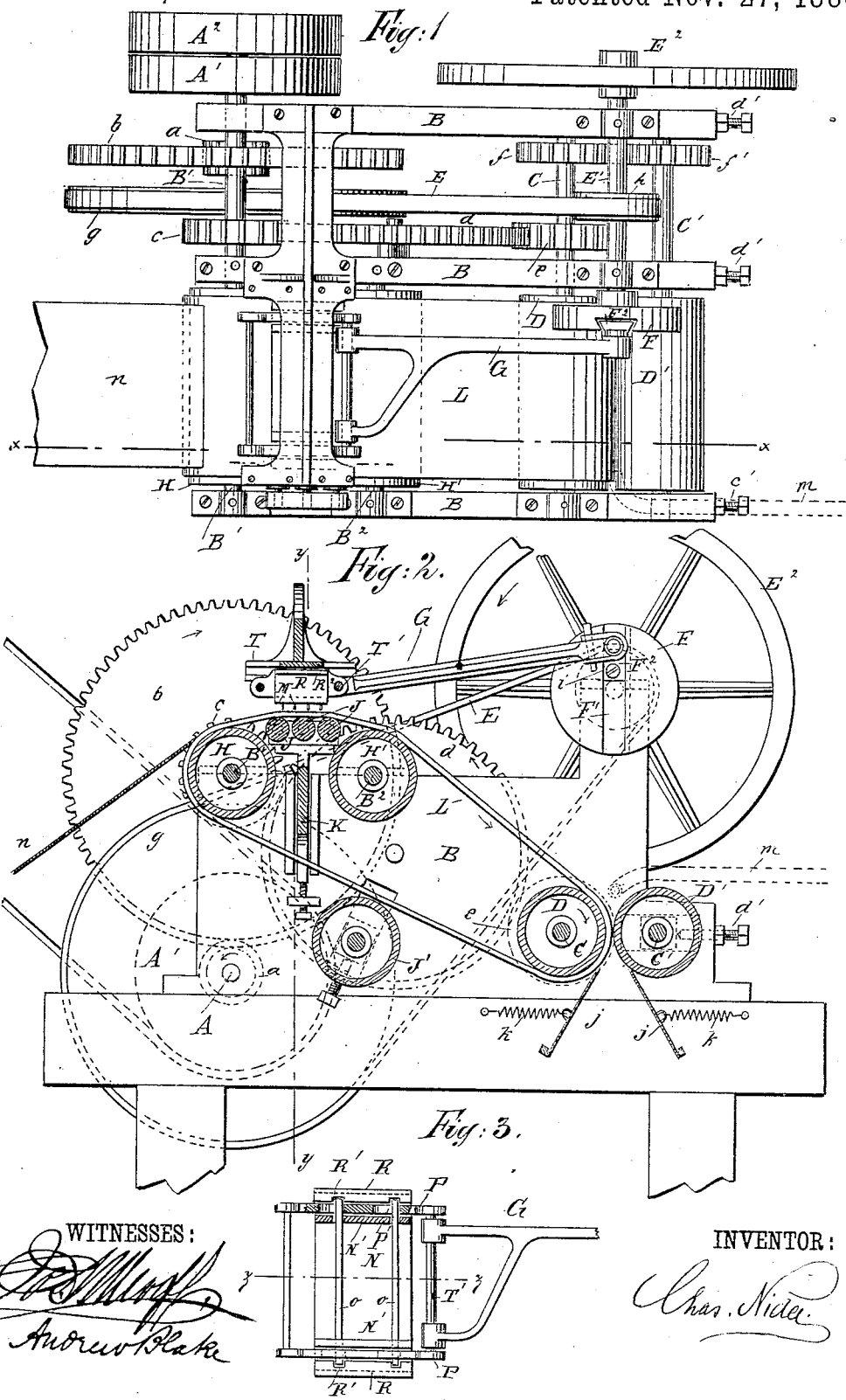
WITNESSES: 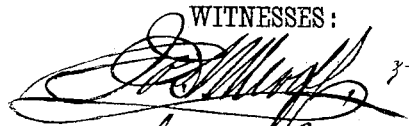
INVENTOR: 

(No Model.) 2 Sheets—Sheet 2.
C. NIDA.
MACHINE FOR CLEANING INTESTINES.
No. 289,302. Patented Nov. 27, 1883.
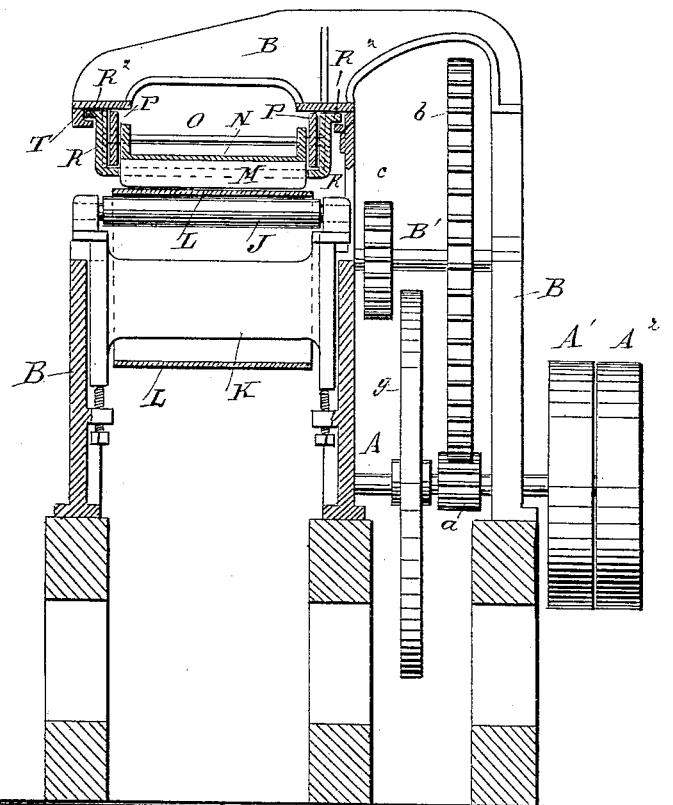
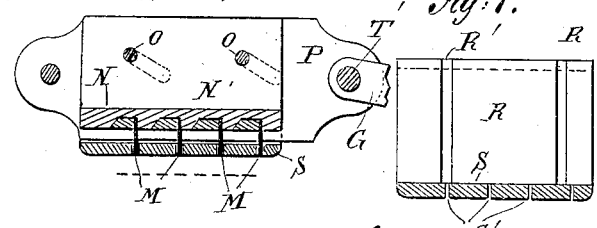
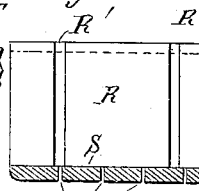
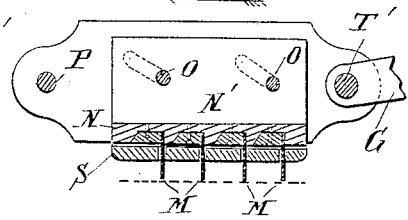
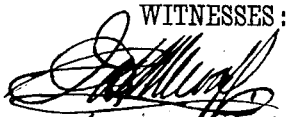
WITNESSES:
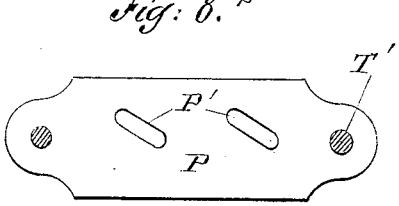
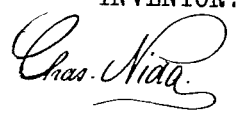
INVENTOR:
Chas. Nida

UNITED STATES PATENT OFFICE.

CHARLES NIDA, OF NEW YORK, N. Y.

MACHINE FOR CLEANING INTESTINES.

SPECIFICATION forming part of Letters Patent No. 289,302, dated November 27, 1883.

Application filed December 16, 1882. (No model.)

*To all whom it may concern:*

Be it known that I, CHARLES NIDA, of the city, county, and State of New York, have invented a new and Improved Machine for Cleaning Intestines, of which the following is a full, clear, and exact description.

The object of my invention is to provide a new and improved machine for cleaning the surfaces of intestines and removing from the same particles of grease, flesh, and other tissue and matter which must be removed for making the intestines serviceable as cases for sausages and other purposes.

The invention consists in various parts and novel combinations of the same, as will be fully described and claimed hereinafter.

In the accompanying drawings, in which similar letters of reference indicate like parts, Figure 1 is a plan view of my improved machine for cleaning intestines. Fig. 2 is a longitudinal sectional elevation of the same on the line $x\ x$, Fig. 1. Fig. 3 is a plan view of the scraper-carriage, parts being shown in section. Fig. 4 is a cross-sectional elevation of the machine on the line $y\ y$, Fig. 2. Fig. 5 is a longitudinal sectional elevation of the scraper-carriage on the line $z\ z$, Fig. 3, the scraper-blades being shown raised. Fig. 6 is a like sectional elevation, showing the blades lowered. Fig. 7 is a longitudinal sectional elevation of the outer guide-frame of the scraper-carriage. Fig. 8 is a longitudinal elevation of the diagonally-slotted plate of the scraper-carriage.

A driving-shaft, A, journaled in the machine-frame B, is provided with a fixed and loose belt-pulley, $A'\ A^2$, respectively, and on the said driving-shaft A is mounted a pinion, $a$, engaging with a cog-wheel, $b$, mounted on a shaft, B', on which is also mounted a smaller cog-wheel, $c$, which engages with an idle cog-wheel, $d$, engaging with a cog-wheel, $e$, on a shaft, C, on which a presser-roller, D, is mounted. A cog-wheel, $f$, on the shaft C, engages with a cog-wheel, $f'$, on a shaft, C', parallel with the shaft C, and having a presser-roller, D', mounted thereon. On the shaft B' is mounted a large belt-pulley, $g$, over which a driving-belt, E, passes, which also passes over a belt-pulley, $h$, on a shaft, E', on which is mounted at one end a fly-wheel, $E^2$, and at the opposite inner end a crank-wheel, F, is mounted, provided with a transverse groove, F', containing a sliding block, $F^2$, which can be locked in the desired position in the groove F' by a binding-screw, $i$, or other suitable device, for altering the length of stroke. A connecting-bar, G, is pivoted to the block $F^2$, and to the scraper-carriage, which will be described hereinafter.

By means of set-screws $d'$ the roller D' can be adjusted a greater or less distance from the roller D. Guards $j$, below the rollers D D', have their upper edges held against the said rollers by springs $k$. A roller, H, is mounted on the shaft B', and a roller, H', is mounted on a shaft, $B^2$, parallel with the shaft B', and on the same level. A series of small horizontal rollers, J J, are journaled in a vertically-adjustable frame, K, between the rollers H H'. An endless-belt, L, made of rubber, leather, or other suitable pliable material passes around the rollers H and D and over the rollers H J H'. A tension-roller, J', rests against the endless belt L, and can be adjusted to press against the same more or less to give the belt L the desired tension. A series of steel scraper-blades, M, are held parallel with the rollers H H' J at the upper edges, in some suitable manner, to the under surface of a plate, N, provided with upwardly-projecting side flanges, N'. Transverse bolts or rods O pass through the flanges N' and through diagonal or inclined slots P' in plates P, which plates rest against the outer surfaces of the flanges, N', and the ends of the bolts or rods O pass into vertical grooves R' in the inner surfaces of plates R, which plates rest against the outer surfaces of the plates P, and are connected by a bottom plate, S, provided with slots S', through which the scraper-blades M pass. The plates R are provided at the upper edges with flanges $R^2$ resting on horizontal tracks T in the frame B, which tracks are at right angles to the lengths of the rollers H, H', and J. The plates R S are adapted to slide on the tracks T, but can be arranged to slide or reciprocate on the frame B in any other suitable manner. The connecting-bar G is connected with the plates P by a cross pintle, T'. The slots P' in the plates P are inclined upward in the direction in which the scraper-carriage, composed of the plates N P R S, moves when scraping. A pipe, $m$, shown in dotted lines, conducts water upon the rollers D D'. Water can be conducted on other parts of the machine if desired. The intestines are passed over an inclined board or platform, n, to the roller H.

The operation is as follows: The intestines are first prepared in the usual manner, and then one or more of them are fed laterally in between the belt L, and the scraper-blades M, which move with their carriage, which is reciprocated by the connecting-bar G, and scrape the fat, clotted blood, or other matter from the surfaces of the intestines. The scraper-blades M have the tendency to move the intestines in the direction toward the left-hand end of the machine, and for that reason they must be seized by a person at the right-hand side of the scraper-carriage, and drawn or pulled in the direction from left to right until the ends can be passed between the rollers D D', which draw the intestines downward and press off the dirt, scraps, &c., on the same, which dirt, scraps, &c., are washed off by the water issuing through the pipe m. The guards j prevent the intestines from being wound on the rollers D D'. The intestines while being scraped by the blades M rest on the yielding surface of the belt L, and thus are not apt to be bruised, cut, or mashed by the blades. As the belt moves continually different parts of the belt L will always be under the edges of the blades.

The scraper-blades M operate in a peculiar manner, which will now be described. At the beginning of a stroke toward that end of the machine from which the intestines are fed—that is, in the direction of the arrow a'—the plate N rests on the plate S, the blades M project through the slots S', and the bolts or rods O are at the lower ends of the inclined slots P', as shown in Fig. 6, so that the lower edges of the scraper-blades M can scrape the intestines. The several parts remain in the above position until the stroke in the direction of the arrow a' is completed. If the scraper-carriage begins to move in the inverse direction of the arrow a'—that is, in the direction of the arrow b'—the plates N and S will not be moved until the plates P have been moved in the direction of the arrow b' such a distance that the upper ends of the slots P' strike against the rods O, and then the stroke in the direction of the arrow b' is completed. If the rods O move toward the upper ends of the slots P', they must naturally rise in the guide-grooves R', and in so doing draw upward the flanges N', through which the rods pass, and thereby the blades M will be raised, and will remain so during the return-stroke. When the scraper-carriage returns in the direction of the arrow a', the blades are first lowered as the rods O slide down the slots P' before the plates N and S are moved, and so on. As the blades are raised in the slots S', the edges of the said slots scrape off the dirt, scraps, &c., clinging to the blades. The scraper-carriage is to be reciprocated very rapidly, and is not stopped while passing the intestines under it. The shock given to the scraper-carriage by the sudden reversing of the motion throws the dirt, scraps, &c., from the blades. By varying the length of the stroke of the scraper-carriage the blades can be adjusted to scrape more or less length of the intestines at each stroke.

I am aware that scraping-machines for cleaning hides, &c., have been constructed heretofore with an endless belt and reciprocating scrapers, and that I do not claim, broadly.

Having thus fully described my invention, I claim as new and desire to secure by Letters Patent—

1. In a machine for cleaning intestines, the combination of reciprocating scrapers with a belt for carrying the intestines, rollers over which the belt passes, and rollers held in a vertically-adjustable support under the upper part of the belt and under the scrapers, substantially as herein shown and described, and for the purpose set forth.

2. In a machine for cleaning intestines, the combination of reciprocating-scrapers, with the belt L and the rollers H H' D D', substantially as herein shown and described, and for the purpose set forth.

3. In a machine for cleaning intestines, the combination, with an endless belt, of a reciprocating-scraper constructed with devices for lowering the blades at the beginning of a stroke and raising them at the beginning of a return-stroke, substantially as herein shown and described, and for the purpose set forth.

4. In a reciprocating scraper, the combination, with a plate provided with downwardly-projecting scraper-blades, of a plate provided with slots through which the blades can pass, a plate provided with inclined slots and of rods passing through the inclined slots, through flanges of the plate to which the scrapers are attached, and having their ends guided to move vertically, substantially as herein shown and described, and for the purpose set forth.

5. In a reciprocating scraper, the combination, with the plate N, having flanges N' and blades projecting from its bottom surface, of the plate S, provided with slots S', and connecting the lower edges of plates R, having vertical slots R', plates P, having inclined slots P', which plates P are connected with the bar for reciprocating the scraper, and of rods O passing through the slots P', the flanges N', and into the vertical grooves R', substantially as herein shown and described, and for the purpose set forth.

CHAS. NIDA.

Witnesses:
Jos. C. WOLFF,
ANDREW BLAKE.